US012809361B2

(12) United States Patent
Streichert et al.

(10) Patent No.: US 12,809,361 B2
(45) Date of Patent: Nov. 24, 2026

(54) MACHINE LEARNING METHOD FOR LEAKAGE DETECTION IN A PNEUMATIC SYSTEM

(71) Applicant: Festo SE & Co. KG, Esslingen (DE)

(72) Inventors: Thilo Streichert, Stuttgart (DE); Silvia Starz, Weinstadt (DE); Steffen Schmid, Neidlingen (DE)

(73) Assignee: Festo SE & Co. KG, Esslingen (DE)

( * ) Notice: Subject to any disclaimer, the term of this patent is extended or adjusted under 35 U.S.C. 154(b) by 1077 days.

(21) Appl. No.: 17/932,773

(22) Filed: Sep. 16, 2022

(65) Prior Publication Data

US 2023/0088241 A1 Mar. 23, 2023

(30) Foreign Application Priority Data

Sep. 20, 2021 (DE) ......................... 102021124254.1

(51) Int. Cl.
*G05B 19/44* (2006.01)
*F15B 19/00* (2006.01)
(Continued)

(52) U.S. Cl.
CPC ............ *G05B 19/44* (2013.01); *F15B 19/007* (2013.01); *G01M 3/26* (2013.01); *G05B 23/024* (2013.01);
(Continued)

(58) Field of Classification Search
CPC .. G05B 19/44; G05B 23/0254; G05B 23/024; F15B 19/007; F15B 19/005; G01M 3/26;
(Continued)

(56) References Cited

U.S. PATENT DOCUMENTS 12,314,385 B1 * 5/2025 Beauchesne ............ G06F 21/52
2009/0234607 A1 * 9/2009 Yuan .................. G05B 19/4065 702/81

(Continued)

FOREIGN PATENT DOCUMENTS

DE 102012015485 5/2014
DE 102020202870 9/2021

(Continued)

OTHER PUBLICATIONS

Yoon et al., "Unsupervised Anomaly Detection with Self-Trained Classification" May 27, 2021, U.S. Appl. No. 63/193,875, pp. 1-34. (Year: 2021).*

(Continued)

*Primary Examiner* — Chase P. Hinckley
(74) *Attorney, Agent, or Firm* — SLEMAN & LUND LLP

(57) ABSTRACT

Continuous condition monitoring of a pneumatic system, and in particular for early fault detection, is provided. The condition monitoring unit is formed with an interface to a memory in which a trained normal condition model is stored as a one-class model, which has been trained in a training phase with normal condition data and represents a normal condition of the pneumatic system. Furthermore, the condition monitoring unit comprises a data interface for continuously acquiring sensor data of the pneumatic system by means of a set of sensors, an extractor for extracting features from the acquired sensor data, a differentiator for determining deviations of the extracted features from learned features of the normal state model by means of a distance metric, a scoring unit for calculating an anomaly score from the determined deviations, and an output unit for outputting the calculated anomaly score.

19 Claims, 6 Drawing Sheets

(51) Int. Cl.

| | |
|---|---|
| ***G01M 3/26*** | (2006.01) |
| ***G05B 23/02*** | (2006.01) |
| ***G06F 18/243*** | (2023.01) |
| ***G06N 20/00*** | (2019.01) |
| ***G06N 20/10*** | (2019.01) |
| ***H04L 9/40*** | (2022.01) |
| *G06N 3/088* | (2023.01) |

(52) U.S. Cl.
CPC ... *G05B 23/0254* (2013.01); *G06F 18/24323* (2023.01); *G06N 20/00* (2019.01); *G06N 20/10* (2019.01); *H04L 63/1425* (2013.01); *F15B 19/005* (2013.01); *G06N 3/088* (2013.01)

(58) Field of Classification Search
CPC .. G06F 18/24323; G06N 3/088; G06N 20/00; G06N 20/10; H04L 63/1425
See application file for complete search history.

(56) References Cited

U.S. PATENT DOCUMENTS

| | | | | |
|---|---|---|---|---|
| 2010/0023307 | A1 | 1/2010 | Lee | |
| 2010/0114806 | A1 | 5/2010 | Harrison | |
| 2018/0137644 | A1* | 5/2018 | Rad | G06V 10/242 |
| 2018/0252553 | A1* | 9/2018 | Daniels | G01D 5/2291 |
| 2019/0370610 | A1* | 12/2019 | Batoukov | G06F 11/0709 |
| 2020/0019890 | A1* | 1/2020 | Rossi | G06F 11/3452 |
| 2020/0210393 | A1* | 7/2020 | Beaver | G06F 16/2474 |
| 2020/0265119 | A1* | 8/2020 | Desai | G06F 17/16 |
| 2020/0310405 | A1* | 10/2020 | Kraus | G05B 19/4183 |
| 2021/0049517 | A1* | 2/2021 | Armelin | G06N 20/20 |
| 2022/0035806 | A1* | 2/2022 | Horesh | G06F 16/2462 |
| 2022/0084732 | A1* | 3/2022 | Liu | H02P 21/001 |
| 2022/0318616 | A1* | 10/2022 | Kamble | G06N 3/0442 |
| 2022/0327204 | A1* | 10/2022 | Abbaszadeh | G06F 21/552 |
| 2022/0350790 | A1* | 11/2022 | Kalyanam | G06F 40/30 |
| 2022/0374657 | A1* | 11/2022 | Pandey | G06V 10/82 |
| 2022/0391724 | A1* | 12/2022 | Yoon | G06N 5/04 |
| 2023/0115878 | A1* | 4/2023 | Streichert | G06F 18/10<br>706/45 |

FOREIGN PATENT DOCUMENTS

| | | | | |
|---|---|---|---|---|
| EP | 1777601 | | 4/2007 | |
| WO | WO-2021225544 | A1 * | 11/2021 | G06N 20/00 |
| WO | WO-2022251462 | A1 * | 12/2022 | G06N 5/04 |

OTHER PUBLICATIONS

Demetgul et al., “Condition Monitoring and Fault Diagnosis for a Servo-Pneumatic System with Artificial Neural Network Algorithms” Mar. 2011, pp. 1-21. (Year: 2011).*
Anton et al., “Security in Process: Detecting Attacks in Industrial Process Data” 9 Sep. 2019, arXiv: 1909.03730v1, pp. 1-6. (Year: 2019).*
Moustafa et al., “DAD: A Distributed Anomaly Detection system using ensemble one-class statistical learning in edge networks” Jan. 13, 2021, pp. 240-251. (Year: 2021).*
Da Costa et al., “Remaining Useful Lifetime Prediction via Deep Domain Adaptations” Jul. 17, 2019, arXiv: 1907.07480v1, pp. 1-30. (Year: 2019).*
Schneider et al., “Industrial condition monitoring with smart sensors using automated feature extraction and selection” Aug. 1, 2018, pp. 1-16. (Year: 2018).*
Festo, “Axis controllers SPC200” May 2013, pp. 1-31. (Year: 2013).*
Yang et al., “Anomaly Detection for Controller Area Network in Braking Control System with Dynamic Ensemble Selection” Aug. 1, 2019, pp. 95418-95429. (Year: 2019).*
Kosturkov et al., “Diagnosis of Pneumatic Systems on Basis of Time Series and Generalized Feature for Comparison with Standards for Normal Working Condition” Feb. 2021, pp. 183-191. (Year: 2021).*
Karkpenko et al., “Neural Network classifiers applied to condition monitoring of a pneumatic process valve actuator” 2002, pp. 273-283. (Year: 2002).*
Freitas et al., “Neural Networks for Pneumatic Actuator Fault Detection” Mar. 1999, pp. 28-34. (Year: 1999).*
Carino et al., “Fault Detection and Identification Methodology Under an Incremental Learning Framework Applied to Industrial Machinery” Sep. 28, 2018, pp. 49755-49766. (Year: 2018).*
Mensi et Bicego, “A Novel Anomaly Score for Isolation Forests” 2019, pp. 152-163. (Year: 2019).*
Itani et al., “A one-class classification decision tree based on kernel density estimation” Mar. 18, 2020, pp. 1-14. (Year: 2020).*
Demetgul et al., “Fault diagnosis of pneumatic systems with artificial neural network algorithms” 2009, pp. 10512-10519. (Year: 2009).*
Andrade et al., “Development of a Methodology Using Artificial Neural Network in the Detection and Diagnosis of Faults for Pneumatic Control Valves” Jan. 27, 2021, pp. 1-21. (Year: 2021).*
Han et al., “Fault Detection of Pneumatic Control Valves Based on Canonical Variate Analysis” Jun. 14, 2021, pp. 13603-13615. (Year: 2021).*
Tax, David Martinus Johannes: One-class classification; concept-learning in the absence of counter-examples. Delft, NL : Technische Universiteit Delft, 2001.—ISBN 90-75691-05-X.
Ruff, L., Vandermeulen, R., Goernitz, N., Deecke, L., Siddiqui, S.A., Binder, A., Müller; Kloft, M.. (2018). Deep one-class classification. Proceedings of the 35th International Conference on Machine Learning, in Proceedings of Machine Learning Research 80:4393-4402.
Zhang Kunbo, Fault Detection and Diagnosis for Multi-Actuator Pneumatic Systems. Stony Brook University, Dissertation, 2011.

* cited by examiner

MACHINE LEARNING METHOD FOR LEAKAGE DETECTION IN A PNEUMATIC SYSTEM

The present invention is in the field of condition monitoring and fault detection of technical systems. In particular, the invention relates to a method and system for continuous condition monitoring and detection of anomalies, in particular of a leakage or other faults in a pneumatic system.

Leakages in a pneumatic system jeopardize its proper functioning and always mean a loss of energy due to the pressure drop caused. Reliable condition monitoring of the pneumatic system is therefore essential in order to be able to react quickly in the event of leaks and restore the system to its proper operating condition. In this context, the quality of the condition monitoring strongly depends on its parameterization. Typically, the anomaly behavior differs from pneumatic system to pneumatic system, as it depends, for example, on the number of sealing points and/or operating conditions, and usually cannot be predicted easily. Often, anomalies are only discovered during routine maintenance work and reactively repaired or noticed due to a machine shutdown.

Based on this, the object of the present application is to provide an approach that is available to operators of a pneumatic system for the diagnosis of anomalies.

This object is solved by a method for continuous condition monitoring, condition monitoring unit and by a computer program for carrying out the condition monitoring. Further advantageous embodiments of the invention with features can be found in the following description.

According to a first aspect, the object is solved by a method for continuous condition monitoring of a pneumatic system, in particular for anomaly detection such as leakage detection. The method comprises the following method steps, which are carried out in an inference phase:

- Provide a trained normal state model as a one-class model that has been trained in a training phase with normal state data representing a normal state of the pneumatic system;
- Continuous acquisition of sensor data of the pneumatic system by means of a set of sensors;
- Extract features from the acquired sensor data;
- Determine deviations of extracted features from learned features of the normal state model using a distance metric (e.g., Euclidean norm, sum norm, maximum norm);
- Calculate an anomaly score from the determined deviations and
- Output of the calculated anomaly score.

This computer-implemented procedure can be used as a diagnostic system and is executed in the background, so that operators only need to react in the event of leaks or other anomalies in order to initiate appropriate troubleshooting means. In particular, the approach is based on identifying features based on sensor data, which are used to train a normal state model that can be used to evaluate future states of the pneumatic system. The higher the deviation of the features determined in the subsequent operating mode from those of the trained normal state, the greater the probability of a fault condition. This is translated into an anomaly score so that the operator of the pneumatic system can react accordingly.

The terminology of the invention is explained in more detail below.

The normal condition model describes the normal condition of the pneumatic system. In the normal state, there are no anomalies, leaks or other faults, and the production process is functioning perfectly. “Production process” is understood to mean the repetition of production cycles, thus the operating state of the pneumatic system. In this context, a cycle or a production cycle describes the movement of a pneumatic actuator back to its starting point. The movement is, for example, a linear displacement of a cylinder piston or a rotary movement of an actuator.

A pneumatic system can have more than one operating state. For example, a pneumatic system can be operated at different pressure levels, with each pressure level characterizing an operating state. In this case, the normal state of the pneumatic system must be learned for each operating state during the training phase.

The normal state can be represented by characteristics of the pneumatic system. These features are based on measured state data of the normal state, such as pressure, pressure curve, flow, flow curve or time stamp. The One-Class model learns these features and defines the normal state based on them. For learning the normal state, the measured normal state data of several whole production cycles are ideally used during training.

For example, a pneumatic system can be a single pneumatic actuator or a plurality of actuators. The plurality of actuators can be operated independently of each other. A plurality of actuators may be arranged on a valve island that can control multiple valves at once. In some applications, the plurality of actuators may also be operated in such a way that they have contact points or are operated dependent on each other or dependent on a common valve.

An example of a pneumatic actuator is a gripper, another example is a pneumatic tensioner (clamper). The latter can, for example, be characterized by four features, namely a reaction and process time each for opening and closing the clamp. Here, the reaction and process times of the tensioner are not measured directly, but extracted based on easily accessible state data. A production cycle of the clamp consists of opening and closing. The associated reaction and process times, as well as the length of the production cycle, can be assigned a numerical value in the normal state. Deviations from this can indicate an anomaly.

Experiments have shown that the characteristics of the normal state can depend strongly on the settings of a throttle between a valve and an actuator. A normal state model can therefore be specific to an actuator. In this case, the throttle valve and/or another suitable controller can be used to regulate the supply pressure of the supply lines, resulting in different travel times and/or reaction times with otherwise constant components.

If anomalies are present, the pneumatic system cannot operate in a normal state. Anomalies can cause delays, energy losses, productivity disturbances, failure of pneumatic system components, production stoppage or similar. The cause of anomalies may be leakage, needle bearing rupture and/or increased friction in the system.

In a preferred embodiment of the invention, the normal state model is a statistical model and/or machine learning model.

In a statistical model, probabilities are assumed for the characteristics of the normal state, whereby the probabilities can be based on empirical values and/or modeling. The characteristics of the normal state are predefined. The parameterization of the characteristics can be adjusted when a new event occurs. A new event is, for example, the connection of a new actuator to the existing pneumatic system.

A machine learning model generates a statistical normal state model based on training data. In the process, the learning model determines the features that characterize the normal state itself. In an iterative manner, a normal state model is generated, an error probability quantifying the deviation of the normal state model is estimated, and the model is optimized until, for example, the error probability no longer improves noticeably. A machine learning model can be trained using deep learning and/or neural networks.

In this context, the term "one-class model" refers to a state model that is generated only from data of the normal state. The features of the normal state specified in the statistical model are quantified (learned features) and it is determined within which deviations state data can still be attributed to the normal state.

During training, the machine learning model generates features from the state data of the normal state and learns their characteristics. As a "one-class model", the learning model is only trained with state data of the normal state and distinguishes in the production process between state data relating to the normal state and to other state data, i.e. of an undetermined remainder (anomaly). Unlike other machine learning models, no appropriately labeled counterexamples of the normal state are used for training. This has the advantage that no data representing the state with anomalies is needed for training. Such state data with anomalies are often not yet available when a pneumatic system is commissioned.

The goal of training is for the model to learn to accurately identify the normal state of the pneumatic system in order to delineate deviations from it as an anomaly in the production process. To do this, an objective function is optimized so that the machine learning model accepts as much state data of the normal state as possible and as little data of a state with anomalies as possible. In the production process, one metric specifies the distance of the state data from the normal state model, or a probability that the state data belongs to the normal state. Another metric is a threshold on this distance or probability. State data is accepted as belonging to the normal state if it is below the threshold.

David Tax discusses different methods and their advantages and disadvantages of one-class models (TAX David Martinus Johannes, One-class Classification: Concept-learning in the Absence of Counter-examples. Technische Universiteit Delft: Dissertation, 2001, ISBN: 90-75691-05-x). According to this, the one-class model can be implemented using, for example, one or more of the following methods:

- Density estimation, which estimates the density of the normal state data and sets a limit on the density distribution. The limit value can be based on a certain distribution (e.g., Poisson or Gaussian distribution). State data that fall outside the limit are classified as not belonging to the normal state;
- Boundary method, which fits the smallest possible volume around the data of the normal state that best characterizes the features of the normal state. The boundary value can be derived directly from the outer area of the volume. An example of the boundary method is the support vector data description ("SVDD"), which uses the smallest possible hypersphere to separate the normal state data from the error state data. The boundary method is described in more detail in e.g. Ruff, L., Vandermeulen, R., Goernitz, N., Deecke, L., Siddiqui, S. A., Binder, A., Müller; Kloft, M. (2018). Deep one-class classification. Proceedings of the 35th International Conference on Machine Learning, in Proceedings of Machine Learning Research 80:4393-4402 Available from http://proceedings.mlr.press/v80/ruff18a.html. Other volumes, such as that of a bounding box, can also be used;
- Reconstruction method, which makes assumptions about the clustering properties of the normal state data and their distribution in subspaces. It is assumed that the state data of an anomaly state does not satisfy the assumptions. An example of the reconstruction method is the k-means method. Here, the normal state data are grouped by features, with each group represented by a "prototype" in the form of a center. If the state data deviates too much from the nearest center, the state is classified as not belonging to the normal state.

In another embodiment, the model can be trained with state data of the normal state and mixed state data containing both normal state data and fault data. For this purpose, the methods "Isolation Forest" or "One-Class-Support-Vector-Machines" can be considered, for example.

Sensor data can be collected by sensors within and/or on the pneumatic system and quantify typical measured variables of a pneumatic system. For example, one or more of the following sensors may be used:

- Flow meter;
- Pressure sensor;
- Temperature sensor;
- Solenoid valve sensor ("solenoid valve sensor"), which measures the direction of movement of the compressed air;
- Capture a timestamp;
- Proximity sensor that measures the position of an actuator of the pneumatic system;
- Linear variable differential transformer ("LVDT") for displacement measurement of an actuator;
- Limit position switch for detecting when the actuator reaches a certain position;
- Microphone; and/or
- Structure-borne sound pickup.

For more details about the sensors and their installation in and/or on the pneumatic system, please refer to ZHANG Kunbo, Fault Detection and Diagnosis for Multi-Actuator Pneumatic Systems. Stony Brook University, Dissertation, 2011.

In the inference phase, the process steps described above are carried out. The inference phase(s) can run continuously during the operating state of the pneumatic system. Alternatively or additionally, the inference phase can also be called only at certain times, for example after an interruption of the operating state.

The extraction of features includes, among other things, the translation of the pure measurement points into interpretable, physical quantities. For example, a duration for a certain process and/or a travel time can be extracted from two measured time stamps. However, it need not always be necessary to extract features. In some cases, the sensor data can also be used directly for the next process step, namely determining the deviations of the extracted features from learned features of the normal state model using a distance metric. In some cases, features only need to be extracted from certain sensor data. It may also be that feature extraction involves logical, comparative, and/or arithmetic operations. The features may be n-dimensional vectors.

A distance metric quantifies how far away the extracted features are from the learned features. Typical distance metrics are the Euclidean norm, sum norm or also the maximum norm. The weights of the distance metrics and/or a combination of distance metrics can also be used. In a configuration phase, a determination of the distance metric to be applied can be performed, e.g. by means of inputs on a user interface.

The anomaly score, which is calculated from the distance metric, is output so that an operator of a pneumatic system or also a control system can take appropriate action(s) in the event of anomalies. The anomaly score can be output in a variety of ways. For example, an operator may receive push messages, mails or other messages. The output can be visual in the form of a graph and/or a quantified value.

The anomaly score gives a probability-based statement about the state of a part and/or the entirety of the pneumatic system. For example, a specific anomaly score can be calculated for a specific actuator. However, a specific anomaly score can also be calculated for a valve terminal. In some cases, "zero" can mean that the pneumatic system is operating in a normal state, i.e. without errors. The higher the anomaly score, the greater the deviation from the learned normal state of the pneumatic system can be. The anomaly score can serve as an early warning system, which already shows small deviations from the normal state. Furthermore, the algorithm for calculating the anomaly score can be parameterized. Thus, for example, the sensitivity of the anomaly score and the training and smoothing interval used to calculate the anomaly score can be adjusted depending on the application. In some cases, the anomaly score can be output as a continuous signal over time. This may be particularly useful for trend detection. The anomaly score can also be output as a discrete signal, for example in the form of a dashboard with mean values, intermediate results, statistical parameters, training data and/or state data.

In a further, preferred embodiment of the invention, the calculated and output anomaly score is used for anomaly detection, in particular for leakage detection, and/or for runtime monitoring of the pneumatic system. Furthermore, the normal state data may comprise pressure signals and/or flow signals and/or microphone/body sound signals and/or valve switching times and/or signals from limit switches and/or continuous position signals and/or further valve-related time signals and/or other analog/digital measurement signals. The terms "measurement signals" and "sensor data" are used interchangeably here.

In a first embodiment, the method may be used reactively, for example as part of a controller in the production process, thus providing feedback to the production process. For example, the method may be implemented in a programmable logic controller (PLC) or on a fieldbus node. In a second embodiment of the invention, the method may be used as a recommendation system without effecting a direct feedback on the process, and serving only for the early detection of anomalies and the issuance of warnings and/or recommendations. The method may also be designed as a recommendation system with a feedback on the process.

Advantageously, the procedure described above can be executed directly in a fieldbus node and/or an edge device. In addition, part of the process or the entire process can be executed on a central computer architecture and/or in a cloud. The procedure can be made available in a persistent memory so that it can be executed even after a power failure or other interruption.

Experiments have shown that the characteristics of the normal state can depend strongly on the settings of a throttle between a valve and an actuator. A normal state model can therefore be specific to an actuator. Therefore, multiple normal state models can be made available in a fieldbus node. The number of normal state models corresponds to the number of actuators.

In a further, advantageous embodiment of the invention, the anomaly score can be forwarded to selected other network nodes via a TCP/IP-based network protocol, in particular via an MQTT protocol or an OPC UA protocol. For this purpose, a broker node can be set up on a fieldbus node of the pneumatic system, which acts as an intermediary to send the calculated anomaly score from a monitoring unit executing the anomaly detection procedure to the selected network nodes. Alternatively or in addition, the anomaly score and/or status data can be forwarded to a programmable logic controller (PLC) and/or a smart device (e.g. tablet) and/or a cloud.

Advantageously, a productivity score can be determined, especially if process cycles are automatically detected, in order to evaluate how a cycle duration develops over a longer time horizon. If an increase in cycle duration occurs and productivity thus decreases, a productivity warning message can be issued, e.g. to warn the operator of the pneumatic machine or plant.

In a further embodiment of the invention, the representation or modeling of the normal state can be done via a bounding-box method or by means of a k-means method or via another suitable one-class-learning method. The bounding-box method is based on the bounding method described above. Instead of a hypersphere, an n-dimensional box is trained here, which serves as a boundary in the production process for data that deviates from the normal state. The n-dimensional box is fitted around the data of the normal state in such a way that its volume is as small as possible, while the normal state is represented as best as possible.

Other one-class-learning methods of the boundary method are for example the nearest-neighbor method or the k-center method.

With the k-means method or k-means clustering, the features of the normal state are grouped into subspaces. Each subspace can be represented by a prototype or center such that the variances between the center and the normal state data are minimal. Other one-class-learning reconstruction methods include the learning-vector-quantization method and the self-organizing-map method.

In a further, advantageous embodiment of the invention, a normalization function may be applied to the determined deviations. The result of this can be the anomaly score. This serves in particular to improve further processing of the anomaly score, for example by an operator and/or a control system. In particular, a sigmoid function (e.g. logistic function) can be used as normalization function. The inflection point (turning point) and/or a slope (gradient) of the sigmoid function can be parameterized and/or the sigmoid function can be linearly rescaled in the training phase so that a graphical representation of the anomaly score is continuous. Ideally, this can result in the anomaly score passing through the coordinate origin, so that a function value of "zero" is output for the anomaly score, in particular for a distance value of "zero", and can thus be interpreted particularly well. In a preferred embodiment of the invention, it may be provided that in order to determine the parameterization of the sigmoid function (inflection point and/or slope), a statistic on the distances of the training data points to the learned normal state is calculated. This may be performed as the final step of the training process.

Furthermore, it can be provided that when a configurable threshold value of the anomaly score is exceeded, the operator of the pneumatic system is alerted. This can happen, for example, by means of a warning message (e.g., to a mobile terminal). In addition, the anomaly score values can be assigned traffic light colors via configurable threshold values. For example, it can be specified that when the anomaly score threshold value of 0.3 is exceeded, a traffic light jumps from green to yellow. A traffic light representation with the following semantics is also conceivable: Normal condition, Functional check recommended, Maintenance recommended, Maintenance required, Warning to user when color changes. Other visualizations and/or soundings of the anomaly score when it exceeds a certain value can also be implemented.

The anomaly score can be output globally for an entire pneumatic system. Alternatively or in addition, the anomaly score can also be output locally for certain subgroups and/or functional units of a pneumatic system, such as for all pneumatic tensioners on a valve terminal, in order to simplify the localization of the anomaly. This involves processing a large number of sensor signals from different sensors, which is advantageous for the efficiency and scalability of anomaly detection and rectification.

Various problems and their remedies can be considered for the manually and/or automatically executed troubleshooting. If a faulty anomaly score is displayed although no fault can be detected in the pneumatic system, the one-class model may have been trained with state data of the transient phase (or startup phase) instead of state data of the normal state, which may deviate from the normal state. In this case, retraining the one-class model after the transient phase has been completed, may be recommended. Alternatively or in addition, the training data might not fully represent the normal state, for example due to multiple operating states. In this case, retraining the one-class model with an extended interval that includes all operating states may be recommended. Post-training with missing operating states is also possible.

If a low anomaly score is displayed although anomalies are present in the pneumatic system, the training data may contain a statistically relevant error component. In this case, it is recommended to retrain the One-class model with normal state data without fault cases or with a statistically irrelevant fault case component.

Furthermore, the sensitivity of the anomaly score may not achieve the desired results. In this case, the parameterization of the anomaly score should be readjusted and/or the smoothing interval should be adjusted, if it is due to the long-term short-time setting.

Troubleshooting can be performed using the state data or completely based on the state data.

In a preferred embodiment, the method can be controlled via meta-parameters. The meta-parameters can represent a parameterization of the model and in particular comprise a determination of the number of k-means centers and/or a number of bounding boxes, and/or a calculation rule for the boundaries of the bounding boxes, and/or a weighting of extracted features, and/or further parameters for feature extraction.

In another preferred embodiment of the invention, the meta-parameters may include a parameterization of the sensors and thus determine, for example, which sensor data is to be acquired, when and/or how often the sensor data is to be acquired, and/or specify the cycle length. Furthermore, the meta-parameters may provide a parameterization of the distance metric, a parameterization of the anomaly score calculation, and/or a parameterization of the output. In addition or alternatively, a method can be provided to determine the meta-parameters inversely from the measurement signals.

Advantageously, the training data in the training phase and the productive data—and especially the sensor data—in the inference phase are preprocessed using the same preprocessing methods. This serves the comparability of the data. If, for example, time windows for feature extraction are determined by automatic pattern recognition, this can be done in the same way in the training and inference phases.

The preprocessing methods may include running a pattern recognition algorithm on the sensor data and/or on the normal state data. This may be used to detect recurring patterns in the sensor data that represent process cycles. In this context, the detected process cycles can be used as parameterization of a time window. Furthermore, in particular, a result of the pattern recognition algorithm can be used to calculate time windows in which feature extraction is performed. The time windows can be configured to be non-overlapping, i.e. consecutive, or overlapping. In particular, the time windows can be defined for certain phases in which features are to be extracted. If no feature extraction takes place, e.g. if the sensor information flows directly into the normal state model, a definition of the time windows is not necessary.

The time window length can be specified as a static value in the unit number of cycles or in time units, such as 10 seconds. If the cycles are detected automatically, the cycle length can also be dynamic. In this case, for example, the average value could be calculated as a characteristic for this time window length. Here, the time window length should not be confused with the training data set length. The training dataset can include a plurality of time windows in order to train a statistical model in a meaningful way. Features can then be extracted from the complete training data set. The training data set can again be divided into many time windows (non-overlapping or overlapping). The time windows can be determined, for example, by the operator of the pneumatic system via a menu based on experience or after considering measurement data (cyclic process length).

Alternatively or cumulatively, the time windows can be determined algorithmically by an automated detection of recurring patterns, for example by an auto-correlation. Furthermore, a trial-and-error procedure can be applied to optimize the window selection and/or the selection of sensor data. The selection of sensor data may also be based on empirical values, which may be input in the form of user input via a human-machine interface or read from a memory. The time window length may be equal to or different from the cycle length. However, since automated (production) processes by pneumatic systems are usually cyclic processes, this is often useful.

Further, one of the preprocessing methods, and in particular a pattern recognition algorithm, may include auto-correlation.

The method described above may further comprise a dimensionality reduction method (e.g., principal component analysis, "PCA"), and the dimensionality reduction method may be applied, in particular, to the raw data and/or to the extracted features in a data preprocessing step.

The calculated anomaly score can preferably be subjected to a low-pass filter, whereby the low-pass filter can be parameterizable.

In a preferred embodiment of the invention, meta-parameters, in particular sensitivity parameters, may be recorded on an input field of a user interface, and the sensitivity parameters may characterize under which conditions, and in particular how fast, differences between the extracted features and the learned features are processed as deviations.

Advantageously, the extracted features can comprise statistical characteristics and in particular mean values, minima, maxima, differences, quantiles, in particular quartiles, skewness and/or kurtosis of the sensor data and/or their derivatives, characteristics of the frequency analysis (e.g. by Fourier analysis) or other selected characteristics over time.

Further, after the sensor data is acquired, the method may execute a pre-processing algorithm on the acquired sensor data that transforms the data into a different format and/or filters out outlier data.

Preferably, after acquiring the sensor data—the method may execute a pattern recognition algorithm to detect recurring patterns in the sensor data (e.g., by auto-correlation) that represent process cycles, and the acquired process cycles may be used as parameterization of a time window.

For example, a one-to-one assignment can be provided, which assigns the detected process cycle length to a time window for extracting the features. However, only certain subsections of the process cycles can be of interest, such as the clamping process in car body construction: A process cycle here comprises the clamping of the car body parts. This usually takes less than a second. The subsequent welding process takes about 30 seconds and the subsequent release again less than one second before the welded part is passed on to the next production step. The entire clamping process therefore also includes the 30-second welding period, which does not have to be taken into account in all cases during feature extraction.

The solution of the object was described above on the basis of the method. Features, advantages or alternative embodiments mentioned therein are likewise to be applied to the other claimed subject matters and vice versa. In other words, the apparatus-based subject matter claims (which are directed, for example, to a condition monitoring unit or to a computer program) may also be further formed with the features described or claimed in connection with the method and vice versa. In this context, the corresponding functional features of the method are formed by corresponding representational modules, in particular by hardware modules or microprocessor modules, of the system or product, and vice versa. The claimed apparatus is accordingly configured to carry out the above-described method. The advantageous embodiments of the invention of the method described above may also be implemented in the condition monitoring unit. These will not be repeated separately here.

According to a second aspect, the invention relates to a condition monitoring unit for continuous condition monitoring of a pneumatic system and, in particular, for early fault detection, wherein the condition monitoring unit is adapted to perform one of the methods described above, comprising:

- An interface to a memory in which a trained normal state model is stored as a one-class model that has been trained with normal state data in a training phase and represents a normal state of the pneumatic system;
- A data interface for continuous acquisition of sensor data of the pneumatic system by means of a set of sensors;
- An extractor for extracting features from the acquired sensor data;
- A differentiator for determining deviations of extracted features from learned features of the normal state model using a distance metric (e.g., Euclidean norm, sum norm, maximum norm);
- A scoring unit for calculating an anomaly score from the determined deviations, and
- An output unit to output the calculated anomaly score.

According to a third aspect, the problem is solved by a computer program comprising instructions which, when the computer program is executed by a computer, cause the computer program to execute the method described above.

In the following detailed description of figures, examples of embodiments which are not to be understood restrictively are discussed with their features and further advantages on the basis of the drawings.

BRIEF

Figure 5:
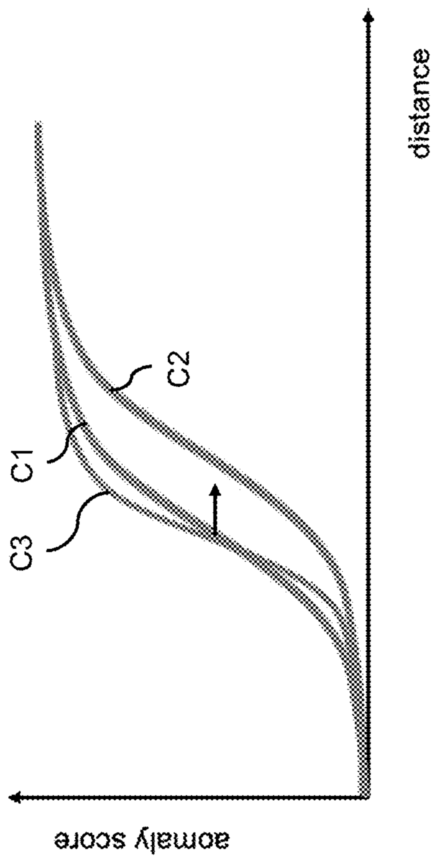

FIG. **4*a*** is a schematic example of a distance determination using the bounding box method;

FIG. **4*b*** is a schematic example of a distance determination using the k-means method;

FIG. 5 is a schematic representation of a normalization function according to the present invention.

DETAILED DESCRIPTION OF THE FIGURES

In the following, the invention is described in more detail by means of embodiment examples in connection with the figures.

The scope of protection of the present invention is given by the claims and is not limited by the features explained in the description or shown in the figures.

The present invention relates to a method and a device for monitoring the condition of pneumatic systems, in particular for detecting anomalies such as leaks.

Figure 1:
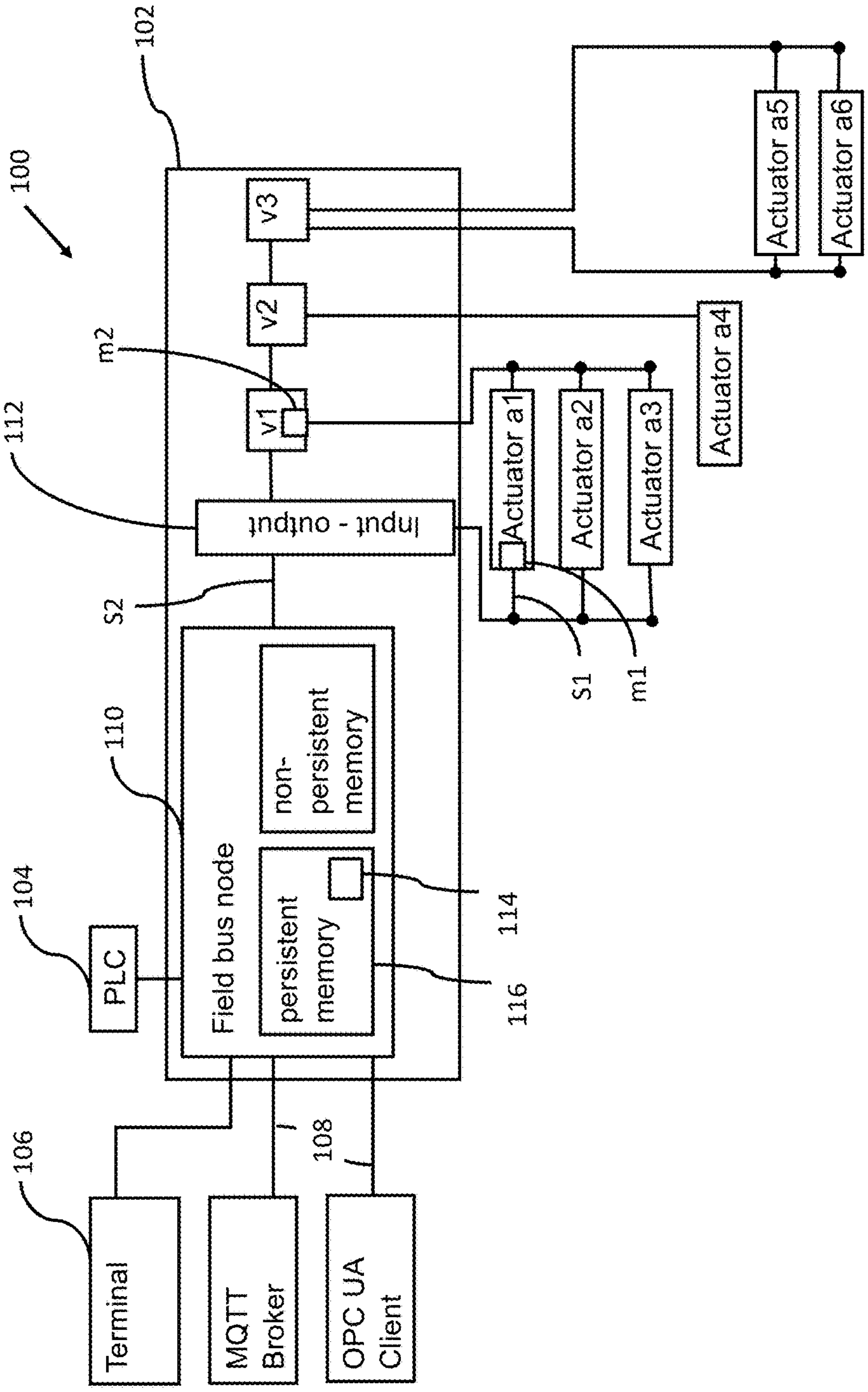
FIG. 1 shows a schematic representation of part of a pneumatic system, in particular a valve terminal with a large number of actuators.

FIG. 1 shows an overview illustration of a pneumatic system 100 with a condition monitoring unit 114. The pneumatic system 100 includes a valve island 102. It is conceivable that a pneumatic system 100 may include other components or multiple valve islands 102. Other components of the pneumatic system 100 may include a controller 104, a terminal 106, and a communication interface 108.

The valve terminal 102 comprises valves v1, v2, v3. In addition, a plurality of actuators a1, . . . , a6 are located on the valve terminal. The actuators a1, . . . , a6 are connected to the valves v1, . . . , v3 and are controlled by them. For example, the actuator a1 can be a tensioner (clamper). The valve v1 connected to it can cause the tensioner (actuator a1) to open and close. Further, a digital input/output hub 112 is located on the valve terminal 102 and is connected to the actuator a1 via the signal line s1. A signal line s2 connects the valve v1 to the stroke 112. Corresponding signal lines lead from the actuators a2, . . . , a6 and the valves v2, . . . v3 to the stroke for digital inputs and outputs 112. For the sake of clarity, a more detailed illustration is omitted here. It should be noted that the signal lines s1, s2 are shown here as wires. However, these can also be replaced in each case by wireless communication interfaces.

The stroke (hub) 112 of the valve terminal 102 is further connected to a fieldbus node 110. The fieldbus node 110 represents the data center of the valve island 102 and includes the condition monitoring unit 114. The condition monitoring unit 114 (hereinafter also referred to as "monitoring unit 114" for short) may be made available in a persistent memory 116 (e.g., flash memory) of the fieldbus node 110. The condition monitoring unit 114 includes, for example, models and their parameters, training and inference algorithms, training data, state data, meta-parameters, and configuration parameters (not shown). In addition, the fieldbus node has non-persistent memory (e.g., RAM). Here, for example, historical state data and the associated anomaly scores can be stored.

The monitoring unit 114 receives sensor data via the stroke 112 in the training and operating state of the pneumatic system 100 (i.e., during inference). Exemplary sensor m1, e.g., a limit switch, on the actuator a1 and a sensor for detecting a timestamp m2 on the valve v1 are shown. The sensor m1 measures, for example, the time at which the actuator a1 has reached a predetermined position. The sensor m2 measures, for example, the time at which the valve v1 was opened or closed. From this sensor data, the monitoring unit calculates an anomaly score using the one-class model described above. This can be communicated to other components and/or valve terminals of the pneumatic system via the communication interfaces 108 and/or displayed on the terminal 106.

The communication interfaces 108 may be, for example, communication interfaces of a distributed system, such as OPC Unified Architecture (OPC UA). This interface may be used to communicate with other fieldbus nodes and/or an IT data pool. In addition or alternatively, the communication interface can be designed as a machine-to-machine communication interface and serve, for example, to transmit messages via a Message Queuing Telemetry Transport (MQTT) protocol. This is shown in FIG. 1 with the reference sign MQTT Broker.

The fieldbus node 110 is further connected to a controller, such as a PLC 104, and a terminal 106. The terminal 106 may include a user interface for input by an operator. In addition or alternatively, the terminal may serve to display 106 the anomaly score provided by the monitoring unit 114.

In a preferred embodiment of the invention, the condition monitoring unit 114 comprises three interfaces, a first interface to the sensors m, a second interface to a memory 116 in which the trained one-class model is stored, and a third interface, which may be a human-machine interface 320 or a terminal 106 and is for inputting and outputting data. In a simple embodiment, the condition monitoring unit 114 may include the extractor 304, the differentiator 310, and the scoring unit 318. Of course, the memory 116 may also be formed as an internal memory so that the trained one-class model may be stored internally and locally in the fieldbus node 110.

Figure 2:
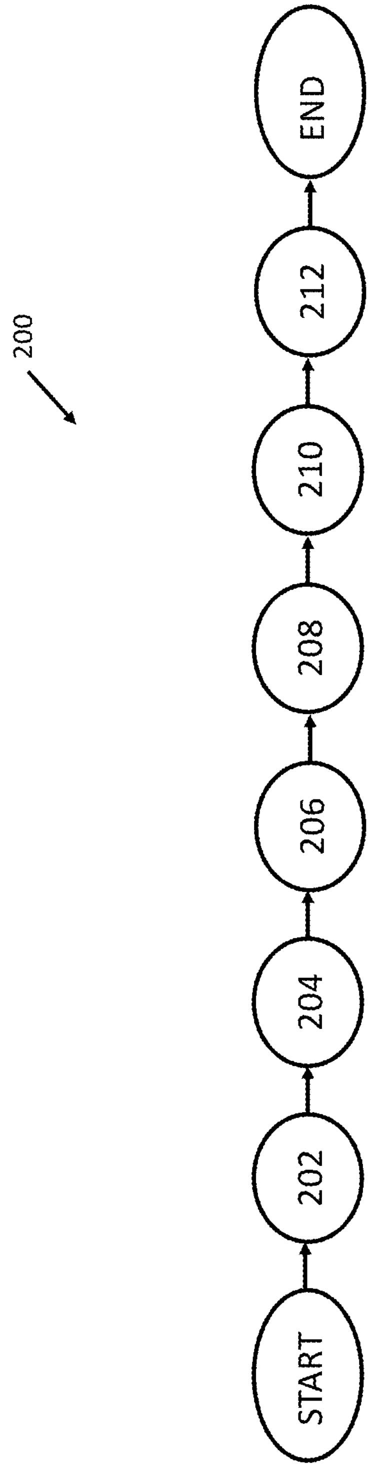
FIG. 2 is an example of a flow chart for a continuous condition monitoring process.

FIG. 2 is an example of a flowchart for a continuous condition monitoring method 200 with steps 202-212 performed in an inference phase. The method 200 may run in the monitoring unit 114 of the pneumatic system 100, or the monitoring unit 114 may initiate the corresponding steps.

In a first step 202, a trained normal state model is provided. The normal state model was trained as a one-class model and with state data of the normal state of the pneumatic system 100. In the normal state, the pneumatic system 100 runs without errors. The normal state data represents this case. If the actuator a1 is a tensioner, the normal state can be used to specify exactly how long it takes to complete a production cycle.

In a step 204, sensor data of the pneumatic system 100 is continuously acquired by means of a set of sensors. The set of sensors includes at least the sensors m1 and m2 described above. In addition, several of these or other types of sensors (for example, flow sensors, pressure sensors, microphones, structure-borne sound pickups) may collect sensor data.

Furthermore, in step 206, features are extracted from the continuously acquired sensor data. By extracting, physically interpretable quantities, the features, are derived from the pure measured data points. For example, measured time stamps are assigned the characteristic of a duration associated with a particular process.

This is followed by step 208, which determines the deviations of the extracted features from learned features of the normal state by means of a distance metric. The distance metric can be, for example, a Euclidean norm, a sum norm, or a maximum norm.

From these determined deviations, an anomaly score is calculated in step 210. This calculation is described in more detail in connection with FIG. 3.

The anomaly score is output in step 212. The output may be, for example, via the terminal 106 of the pneumatic system. The anomaly score may also be communicated exclusively or additionally to other participants via the communication interface 108. In addition or alternatively, the anomaly score can be communicated, for example, as a control variable to the control 104. This can adjust its manipulated variable if required. Furthermore, the anomaly score and the associated state data can be stored in the non-volatile memory 116 of the fieldbus node 110.

Figure 3:
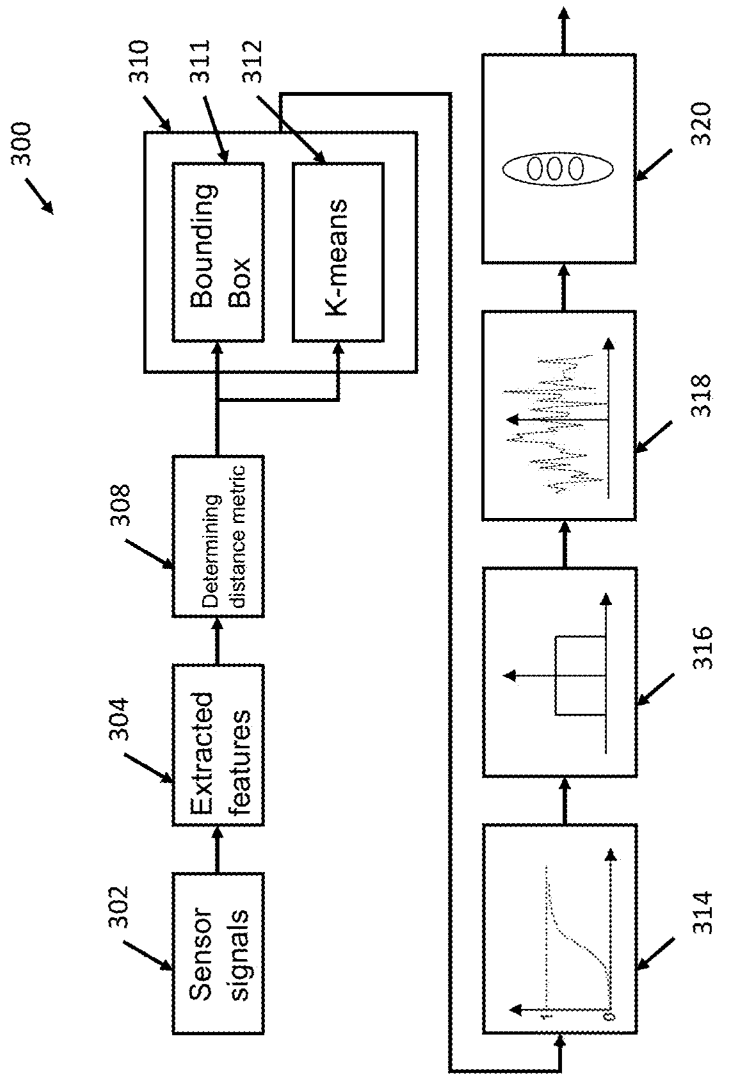
FIG. 3 shows an example of a schematic representation of a signal flow diagram of an exemplary pneumatic system with continuous condition monitoring.

FIG. 3 shows an example of a schematic representation of a signal flow diagram 300 including associated signal processing components of an exemplary continuous condition monitoring pneumatic system. In particular, box 310 represents a differentiator directed to determine deviations on which the calculation of the anomaly score is based. The input 302 consists of the continuously recorded (acquired) sensor signals. These include, for example, valve switching times and/or signals from the limit switches of an actuator, for example a cylinder. From these sensor signals, as shown in box 304, features are extracted by means of an extractor 304, i.e. quantities are derived that provide information about the functioning of the pneumatic system. In the present case, this can include the actuator features "reaction time extension", "travel time extension", "reaction time retraction", and "travel time retraction" and/or possible latencies of the actuator.

The extracted features can be normalized to simplify their representation in an n-dimensional space. This is particularly advantageous if the features derived from the sensor data contain different physical quantities and/or magnitudes (for example, pressure and time) that are to be further processed together.

In box 308, a distance metric may be determined as an optional step in a configuration phase, e.g., via data collection on a human-machine interface applied or to be applied by the differentiator 310.

In Box 310, which represents Differentiator 310, the deviation of the extracted features from the learned features is determined. The learned features refer to the features derived during training by normal state data. The deviation can be determined either by a bounding-box method 311 or by a k-means method 312. It is also conceivable that both methods could be used for more robust results given sufficient computational capacity.

In the bounding-box method 311 it is determined whether the extracted features lie within the space bounded by the bounding-box or whether a boundary value violation is to be assumed. In the latter case, the distance between the extracted features and the bounding box is determined, otherwise the distance is "zero" (see explanation for FIG. 4*a*). In the k-means method, the distance of the features to the nearest cluster center is determined (see explanations for FIG. 4*b*).

The determined distance is mapped to an arbitrary interval (for example, from "zero" to "one") of the anomaly score by a normalization function 314. The result is smoothed by the low-pass filter 316 and the corresponding anomaly score is provided as output by a scoring unit 318. The anomaly score is finally output by an output unit 320.

Figure 4A:
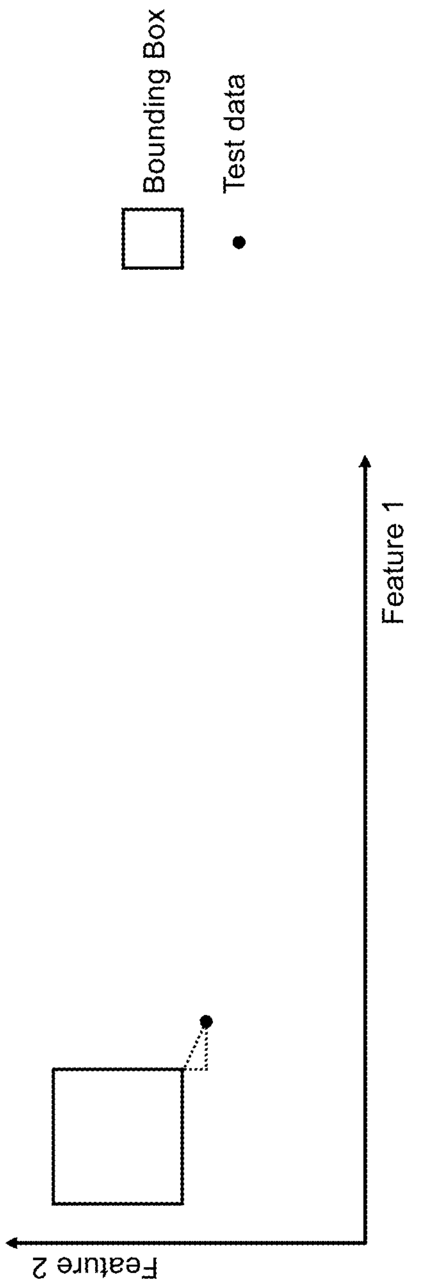
Figure 4B:
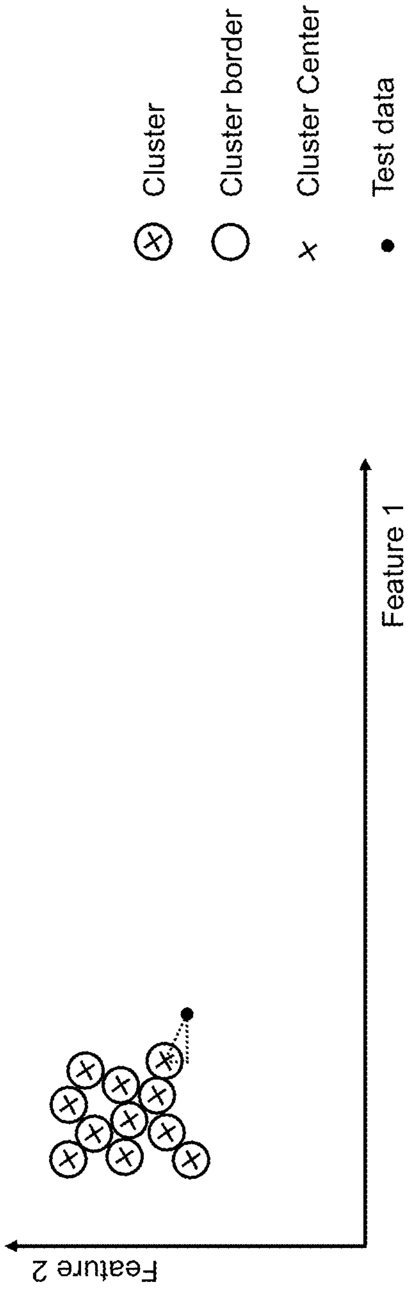

FIG. 4*a* and FIG. 4*b* illustrate in an exemplary manner the determination of the distance of the extracted features from the normal state of the pneumatic system. FIG. 4*a* shows the determination of the deviation using the bounding-box method. The bounding-box (rectangle shown) represents the space to which the learned features of the normal state belong. If an extracted feature lies inside the bounding-box, then the distance is zero. If an extracted feature lies outside the bounding-box, its distance from the bounding box is determined. This is shown by the dashed line. Various distance metrics, weighted distance metrics or a combination of distance metrics can be used for this purpose. Distance metrics are for example the Euclidean norm, the maximum norm or the sum norm.

FIG. 4*b* shows the determination of the deviation using the k-means method. The "cluster centers" represent the centers of the k-means clusters that group the learned feature data of the normal state. The grouping of the learned feature data of the normal state is illustrated by the cluster outline in FIG. 4*b*. The distance of the extracted feature ("test data") to the nearest center of the learned features is determined within the k-means method (dashed line).

Based on the distances determined by the bounding-box or k-means method, the one-class model determines an anomaly score that is output to the operator via the output unit 320.

For FIG. 4*a* and FIG. 4*b*, it should be noted that the two-dimensional representation chosen is for illustration purposes only and that the features may be higher-dimensional (n-dimensional) objects.

FIG. 5 is a schematic representation of a normalization function according to the present invention. The normalization function is a sigmoid function. In the present case, the sigmoid function was rescaled so that a distance of zero can be assigned an anomaly score of zero. The graphs C1-C3 show the influence of the parameterization of the sigmoid function on the anomaly score and how it represents the measured deviations ("distance" on the x-axis). The deviations are mapped to the anomaly score 0 . . . 1, which facilitates their interpretability and thus an appropriate reaction to possible anomalies.

In particular, the point of inflection and slope of the sigmoid function are parameterized in the present case. Starting from the sigmoid curve C1, increasing the inflection point means a shift along the positive direction of the x-axis. This makes the model less sensitive, because higher deviations or distances are now represented by a lower anomaly score.

Furthermore, an increase in the slope of the sigmoid curve C1, as exemplarily shown for curve C3, causes smaller differences in the deviations or distances to lead to larger differences in the anomaly score. Depending on the error tolerance of the pneumatic system, the normalization curve can be selected and parameterized.

Finally, it should be noted that the description of the invention and the embodiments are in principle not to be understood restrictively with respect to any particular physical realization of the invention. All features explained and shown in connection with individual embodiments of the invention may be provided in different combinations in the subject matter according to the invention in order to simultaneously realize their advantageous effects.

The scope of protection of the present invention is given by the claims and is not limited by the features explained in the description or shown in the figures.

It is particularly obvious to a person skilled in the art that the invention can be applied not only to the sensor data mentioned, but also to other metrologically recorded variables that at least partly influence an operating state of the pneumatic system. Furthermore, the components of the condition monitoring unit can be realized distributed on several physical products.

The invention claimed is:

1. A method for continuous condition monitoring of a pneumatic system, comprising:

in a training phase, training a trained normal state model as a one-class model with normal state data representing a normal state of the pneumatic system;

in an inference phase, continuously acquiring sensor data from the pneumatic system using a set of sensors, wherein the set of sensors includes at least one of a flow meter, a pressure sensor, a temperature sensor, a solenoid valve sensor, which measures direction of movement of compressed air, a sensor for capturing a time stamp, a proximity sensor that measures position of an actuator of the pneumatic system, a linear variable differential transformer ("LVDT") for displacement measurement of an actuator, a limit position switch for detecting when an actuator reaches a certain position, a microphone, and/or a structure-borne sound pickup;

in a fieldbus node of a valve terminal of the pneumatic system, extracting features from the acquired sensor data, wherein the valve terminal of the pneumatic system includes at least one valve and a digital input/output hub, the digital input/output hub being configured to be connected to at least one actuator via a first signal line, the at least one valve being connected to the digital input/output hub via a second signal line, and the at least one valve being configured to control the at least one actuator;

in the fieldbus node of the valve terminal of the pneumatic system, determining deviations of extracted features from learned features of the normal state model using a distance metric;

in the fieldbus node of the valve terminal of the pneumatic system, calculating an anomaly score from the determined deviations;

in the fieldbus node of the valve terminal of the pneumatic system, outputting the calculated anomaly score, wherein the calculated and output anomaly score is used for anomaly detection, comprising at least leakage detection, and/or for runtime monitoring of the pneumatic system and wherein the normal state data comprise pressure signals and/or flow signals and/or microphone/body sound signals and/or valve switching times and/or signals from limit switches and/or continuous position signals and/or further valve-related time signals and/or other analog/digital measurement signals; and forwarding the anomaly score from the fieldbus node to selected other network participants via a TCP/IP-based network protocol, via one of an MQTT protocol or an OPC UA protocol.

2. The method of claim 1, wherein the normal state model is a statistical model and/or machine learning model.

3. The method according to claim 1, in which a productivity score is determined, when process cycles are automatically detected in order to evaluate how a cycle duration develops over a time horizon longer than the cycle duration.

4. The method according to claim 1, wherein a representation or modeling of the normal state is performed via a bounding-box method or by means of a k-means method.

5. The method according to claim 1, in which a normalization function, comprising a sigmoid function, is applied to the determined deviations and/or wherein an inflection point and/or a slope of the sigmoid function can be parameterized and/or wherein the sigmoid function is linearly rescaled in the training phase so that a graphical representation of the anomaly score is continuous.

6. The method according to claim 1, in which the method is controlled via meta-parameters, wherein the meta-parameters comprise a parameterization of the model, comprising at least a determination of a number of k-means centers and/or a number of bounding boxes and/or a calculation rule for boundaries of the bounding boxes and/or a weighting of extracted features and/or further parameters for feature extraction.

7. The method according to claim 1, in which the normal state data in the training phase and productive data, comprising at least sensor data, in the inference phase are preprocessed using the same preprocessing methods.

8. The method according to claim 7, wherein the preprocessing methods comprise an execution of a pattern recognition algorithm on the sensor data and on the normal state data, in order to detect in the sensor data recurring patterns representing process cycles and wherein the detected process cycles are used as parameterization of a time window and/or wherein a result of the pattern recognition algorithm is used to calculate time windows in which the feature extraction is executed.

9. The method of claim 7, wherein one of the preprocessing methods comprises at least a pattern recognition algorithm, and wherein the pattern recognition algorithm comprises auto-correlation.

10. The method according to claim 1, comprising a dimensionality reduction method, and wherein the dimensionality reduction method is applied to the raw-sensor data and/or to the extracted features, in a data preprocessing step.

11. The method of claim 1, wherein the calculated anomaly score is subjected to a low-pass filter, the low-pass filter being parameterizable.

12. The method according to claim 1, in which sensitivity parameters are detected on an input field of a user interface, the sensitivity parameters characterizing under which conditions comprising at least how quickly differences between the extracted features and the learned features are processed as deviations.

13. The method according to claim 1, wherein the extracted features comprise statistical characteristics and comprise mean values, minima, maxima, differences, quantiles, quartiles, skewness and/or kurtosis of the sensor data and/or their derivatives, characteristics of a frequency analysis or other selected characteristics over time.

14. The method of claim 1, wherein the method, after acquiring the sensor data, executes a preprocessing algorithm on the acquired sensor data that transforms the data into a different format and/or filters out outlier data.

15. A condition monitoring unit in a fieldbus node of a valve terminal of a pneumatic system for continuous condition monitoring of the pneumatic system for early fault detection, the condition monitoring unit being designed to carry out the method of claim 1, having:

an interface to a memory in which a trained normal state model is stored as a one-class model that has been trained in a training phase with normal state data and represents a normal state of the pneumatic system;

a data interface for continuously acquiring sensor data of the pneumatic system by means of a set of sensors;

an extractor for extracting features from the acquired sensor data;

a differentiator for determining deviations of the extracted features from learned features of the normal state model using a distance metric;

a scoring unit for calculating an anomaly score from the determined deviations; and an output interface to a terminal or human-machine interface for outputting the calculated anomaly score.

16. At least one non-transitory computer readable storage medium comprising instructions which, when the instructions are executed, cause one or more processors to execute the method according to claim 1.

17. A method for continuous condition monitoring of a pneumatic system, comprising:

in a training phase, training a trained normal state model as a one-class model with normal state data representing a normal state of the pneumatic system;

in an inference phase, continuously acquiring sensor data from the pneumatic system using a set of sensors, wherein the set of sensors includes at least one of a flow meter, a pressure sensor, a temperature sensor, a solenoid valve sensor, which measures direction of movement of compressed air, a sensor for capturing a time stamp, a proximity sensor that measures position of an actuator of the pneumatic system, a linear variable differential transformer ("LVDT") for displacement measurement of an actuator, a limit position switch for detecting when an actuator reaches a certain position, a microphone, and/or a structure-borne sound pickup;

in a fieldbus node of a valve terminal of the pneumatic system, extracting features from the acquired sensor data, wherein the valve terminal of the pneumatic system includes at least one valve and a digital input/output hub, the digital input/output hub being configured to be connected to at least one actuator via a first signal line, the at least one valve being connected to the digital input/output hub via a second signal line, and the at least one valve being configured to control the at least one actuator;

in the fieldbus node of the valve terminal of the pneumatic system, determining deviations of extracted features from learned features of the normal state model using a distance metric;

in the fieldbus node of the valve terminal of the pneumatic system, calculating an anomaly score from the determined deviations;

in the fieldbus node of the valve terminal of the pneumatic system, outputting the calculated anomaly score, wherein the calculated and output anomaly score is used for anomaly detection, comprising at least leakage detection, and/or for runtime monitoring of the pneumatic system and wherein the normal state data comprise pressure signals and/or flow signals and/or microphone/body sound signals and/or valve switching times and/or signals from limit switches and/or continuous position signals and/or further valve-related time signals and/or other analog/digital measurement signals; and alerting the operator of the pneumatic system when a configurable threshold value of the anomaly score is exceeded.

18. The method of claim 17, further comprising:

forwarding the anomaly score from the fieldbus node to selected other network participants via a TCP/IP-based network protocol, via one of an MQTT protocol or an OPC UA protocol, wherein the selected other network participants include one or more of:

a terminal;

a human-machine interface;

a programmable logic controller (PLC);

a smart device; and/or a cloud.

19. The method of claim 18, wherein the smart device is a tablet.

* * * * *